United States Patent [19]
Hurst

[11] Patent Number: 5,227,184
[45] Date of Patent: * Jul. 13, 1993

[54] METHOD FOR SANITIZING FOOD PRODUCTS

[75] Inventor: William D. Hurst, Wichita, Kans.

[73] Assignee: American Water Purification, Inc., Wichita, Kans.

[*] Notice: The portion of the term of this patent subsequent to Jul. 18, 2006 has been disclaimed.

[21] Appl. No.: 892,612

[22] Filed: May 29, 1992

Related U.S. Application Data

[63] Continuation of Ser. No. 358,938, May 24, 1989, abandoned, which is a continuation-in-part of Ser. No. 114,709, Oct. 30, 1987, Pat. No. 4,849,237.

[51] Int. Cl.$^5$ .......................... A23C 21/00; A23B 4/14
[52] U.S. Cl. ................................... 426/312; 426/320; 426/321; 426/474; 426/644
[58] Field of Search ............... 426/321, 312, 474, 644, 426/320

[56] References Cited

U.S. PATENT DOCUMENTS

| | | | |
|---|---|---|---|
| 2,524,182 | 10/1950 | Teigen | 99/103 |
| 3,523,891 | 8/1970 | Mehl | 210/707 |
| 3,546,114 | 12/1979 | Dietz | 210/63 |
| 3,549,528 | 12/1970 | Armstrong | 210/60 |
| 4,021,585 | 5/1977 | Svoboda et al. | 426/332 |
| 4,309,388 | 1/1982 | Tenney et al. | 422/304 |
| 4,517,159 | 5/1985 | Karlson | 422/20 |
| 4,827,727 | 5/1989 | Caracciolo | 62/63 |
| 4,849,237 | 7/1989 | Hurst | 426/321 |

OTHER PUBLICATIONS

Torricelli, A. Advances in Chemistry, 1959, No. 21, Ozone Chemistry and Technology, p. 375, American Chemical Society, Washington, D.C.
Journal of Food Science, vol. 51, No. 2, 1986 Efficacy of Ozone as a Disinfectant for Poultry Carcasses & Chill Water.
Advances in Chemical Series, pp. 57–65, Application of Ozone from Sterilamp in Control of Mold, Bacteria and Odors.
Ozone Chemistry and Technology, pp. 370–374, Bactericidal Activity of Ozone and Chlorine Against *Escherichia coli* at 1° C.
Ozone Science & Engineering, vol. 7, pp. 121–135, Treatment of Humic Waters by Ozone.
Ozone, pp. 305–330, Applications in the Food Industry and Agriculture; Other Fields of Utilization.

*Primary Examiner*—Jeanette Hunter
*Assistant Examiner*—Helen F. Pratt

[57] ABSTRACT

A method for sanitizing food products that utilizes ozone containing bubbles. The food product is immersed in a liquid bath that has a plurality of ozone containing bubbles streaming therethrough. Enough ozone containing bubbles are provided such that a continuous stream of bubbles are always present within the liquid bath. The ozone containing bubbles are typically an ozone air mixture and can be introduced into the liquid bath directly as a bubble gas stream or can be mixed with the liquid of the liquid bath prior to their introduction into the bath itself. When the food product is immersed in the bath containing the ozone containing bubbles, the ozone in the bubbles contacts the surfaces of the food product and has a sanitizing effect thereon.

8 Claims, 1 Drawing Sheet

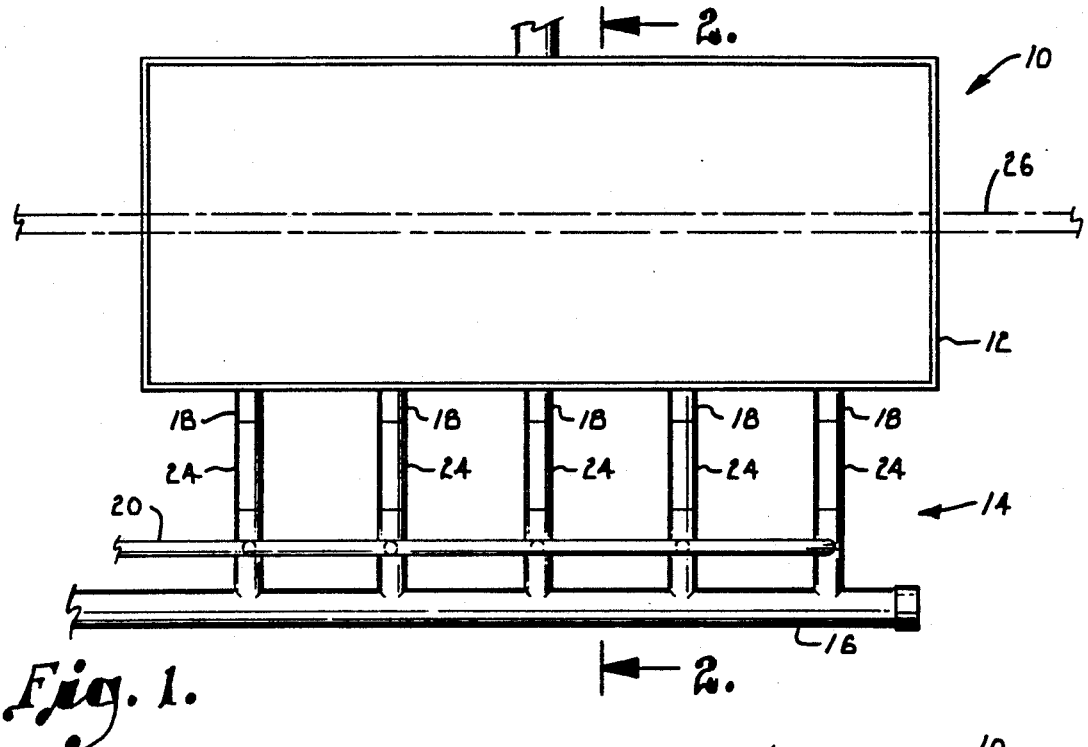
Fig. 1.
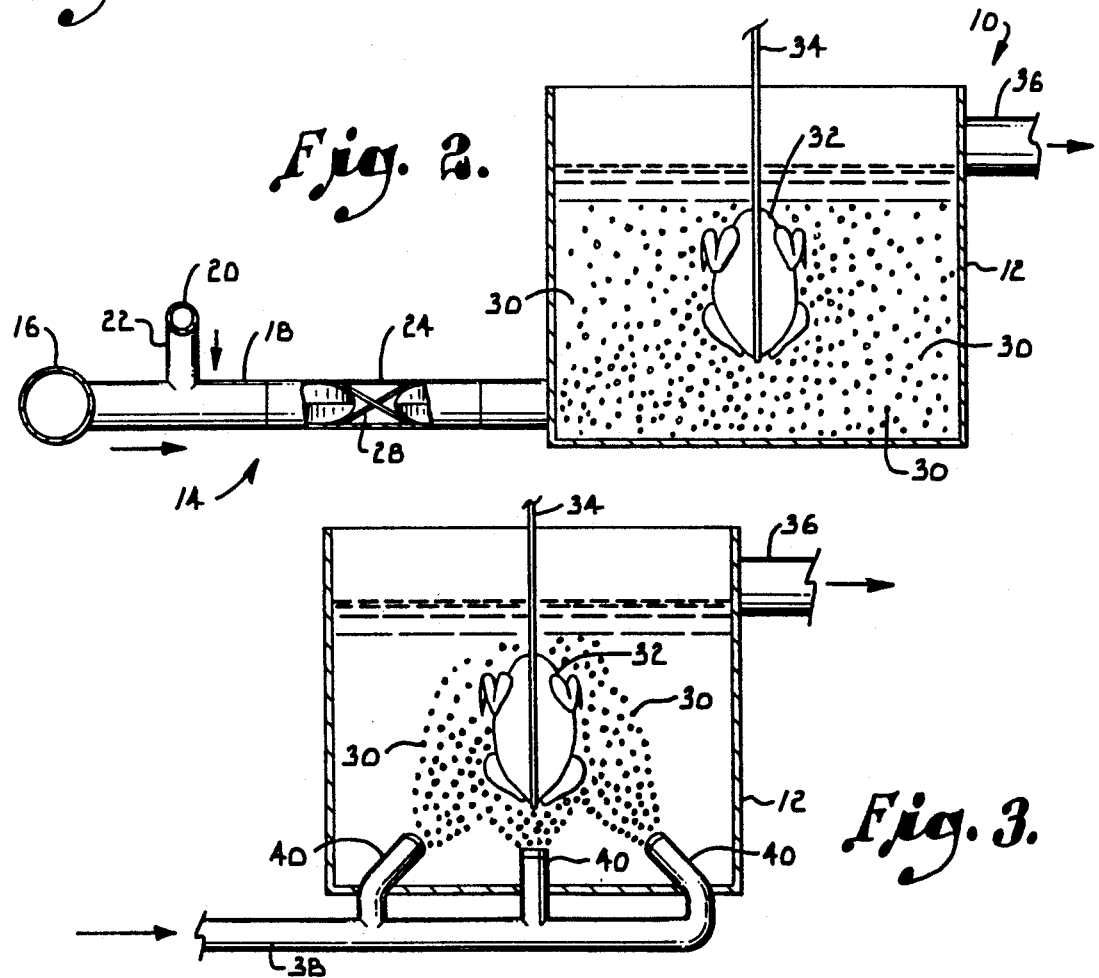
Fig. 2.
Fig. 3.

METHOD FOR SANITIZING FOOD PRODUCTS

This is a continuation of copending application Ser. No. 07/358,938 filed on May 24, 1989 now abandoned, which is a continuation-in-part of my co-pending application Ser. No. 114,709 now U.S. Pat. No. 4,849,237 entitled "Method for Sanitizing Poultry Carcasses in a Poultry Processing Plant Utilizing Ozonated Water" which was filed on Oct. 30, 1987.

BACKGROUND OF THE INVENTION

This invention relates in general to a method for sanitizing food products and more particularly to a method wherein ozone containing bubbles are used to sanitize food products which are capable of being immersed in a liquid bath.

It has become increasingly important in the food industry that products provided to the public be quite sanitary. A health conscious and knowledgeable public demands that the food products which are made available be of highest quality. Such products must be safe and free from the effects of disease causing bacteria or harmful chemicals. Tight sanitary standards are not only demanded by the public, but are also required by governmental health and safety regulations. Thus, food processors are ever seeking safe, economical, and efficient methods which help them meet rigid public imposed standards and government regulations.

Bacteria of some kind or another can be found on virtually every object in our environment. Bacteria are present on most living organisms, such as poultry, cattle and swine and are also found on other food products such as fruits and vegetables. While many bacteria are beneficial to both man and the environment, others are harmful, especially those that are capable of causing sickness or disease in man.

Some of the more pathogenic bacteria are those classified as Enterobacteriaceae and include such organisms as *Escherichia coli*, Salmonella spp and Enterobacter spp. These types of bacteria are normally found within the intestinal flora of mammals and are considered responsible for such intestinal infections as bacterial dysentery and bacterial food poisoning. While efforts are made to control the existence of these types of bacteria in foods and in food processing facilities, large scale food preparation operations often provide favorable environments for the growth of these organisms.

A number of steps have been taken in the food industry in an effort to solve the bacterial problem. Attempts have been made to sanitize food products by processes involving heat, ultraviolet irradiation or chemicals. While each of these methods show some efficacy under certain conditions, there are many situations where these methods are inapplicable, inefficient or perhaps undesirable for particular food products.

A primary disadvantage of utilizing any of the aforementioned sanitizing methods is that such methods often lead to a change in the appearance or taste of the food product that makes the product undesirable to the consumer. Furthermore, some chemical methods are undesirable because they pose potential toxicity problems because of the particular chemical which may be required in the sanitizing process.

Ozone dissolved in an aqueous medium has been shown to have some efficacy in sanitizing food products. However, all dissolved ozone sanitizing processes in use today, as far as applicant is aware, have not proven to be entirely satisfactory. They have not adequately or consistently solved the problem of bacteria on the surfaces of food products. Applicant has discovered a method whereby the sanitizing effects of ozone on food products can be substantially enhanced without adversely affecting the products.

It is therefore a primary object of the present invention to provide a method for sanitizing food products that utilizes ozone but which safely, efficiently and effectively eliminates surface borne bacteria on food products.

It is another object of the present invention to provide a method for sanitizing food products that utilizes applicant's discovery that a plurality of ozone-air bubbles introduced into an aqueous medium in a manner creating a continuous flow of such bubbles in the medium greatly increases the bacteria killing effect of the ozone when the bubbles contact the surfaces of the food products.

It is a further object of the present invention to provide a method for eliminating surface borne bacteria on food products by causing the food products to be moved through a liquid bath having a plurality of ozone-air bubbles streaming upwardly through the liquid medium such that the surfaces of the food products are in continuous and direct contact with a plurality of the ozone-air bubbles while immersed in the bath.

It is another object of the present invention to provide such a method for sanitizing food products which is safe and efficient and which does not cause physical or cosmetic damage to the product.

It is also an aim of the present invention to provide a method for effectively and efficiently sanitizing food products but which eliminates the need to ozonate the liquid in the liquid bath prior to the introduction of the ozone-air bubbles in the bath. Other and further objects and aims of the invention will be made clear or become apparent from the following description and claims.

SUMMARY OF THE INVENTION

It has been discovered that food products that are capable of being immersed in a liquid bath can be effectively sanitized by a process wherein the food products are introduced into a liquid bath that has a plurality of ozone-air bubbles continuously streaming through the liquid in a manner which causes the bubbles to interface with the surfaces of the products. Exposing food products to the ozone-air bubbles in such a manner has been found to effectively eliminate bacteria present on the product surfaces. As the ozone-air bubbles come in contact with such surfaces, it is believed that the ozone contained in the respective bubbles oxidizes the food product's surfaces in a manner which effectively eliminates any bacteria. This method contemplates exposing the food products to a plurality of moving ozone-air bubbles which stream upwardly through the bath so that the food products are exposed to a multitude of the ozone containing bubbles.

A food product to be sanitized by this method may be immersed in the liquid bath in any manner that allows for intimate contact between the ozone-air bubbles streaming in the bath and the bacteria contaminated surfaces of the product. The ozone-air bubbles may be introduced into the liquid bath by any desired method. One method which has been found effective includes forming a gaseous mixture of ozone and air and then introducing the mixture into the liquid bath in a manner creating a multitude of ozone-air bubbles in the bath. A second equally desirable method involves first mixing the gaseous ozone-air mixture with a quantity of the liquid of the liquid bath and then injecting this combined, aqueous mixture into the bath in a manner forming a multitude of ozone-air bubbles.

Other objects of the invention will be made clear or become apparent from the following description and claims when read in light of the accompanying drawings which form a part of the specification and are to be read in conjunction therewith and in which like reference numerals are used to indicate like parts in the various views.

BRIEF DESCRIPTION OF THE DRAWINGS

FIG. 1 is a top plan view of a proposed embodiment of an apparatus for performing the method of this invention;

FIG. 2 is a sectional view through line 2—2 of FIG. 1 illustrating a poultry carcass being exposed to the ozone containing bubbles by the method of this invention;

FIG. 3 is a sectional view of an alternate embodiment of an apparatus for performing the method of this invention.

DESCRIPTION OF THE PREFERRED EMBODIMENT

In accordance with the present invention, any food product or foodstuffs that can be immersed in a liquid bath can be sanitized by the immersion of the food product in a liquid bath that has a continuous stream of ozone-air bubbles introduced therein. Typically, the liquid contained in the liquid bath will be water, but any liquid that is "generally-regarded-as-safe" for use with food products can be utilized.

The food product or at least some of the surfaces of the food product that may have bacteria or other disease causing agents thereon must, of course, be capable of being immersed in the liquid bath without damaging the food product itself. The food product may be immersed into the liquid bath by any desired means. Each individual food product will have its own characteristic requirements which will dictate how that food product should be presented into the liquid bath. Such particularized needs are considered within the scope of this invention and any appropriate means and method of immersing any given food product into the bath without damaging the product is contemplated.

The liquid bath itself may be held in any of a variety of containers that is capable of holding the liquid and in or through which the food product may be immersed and passed. It is conceived that a tank, trough, container or other suitable vessel could be utilized to meet the requirements for a particular food product. It is believed that most food products with which the sanitizing method of this invention is utilized will require a residence time of several minutes in the bath while a plurality of ozone-air bubbles are continuously streaming through the bath, in order to achieve complete sanitization. In this regard, a container of a suitable shape and size to meet residence time requirements is necessary and such containers or vessels are known to those skilled in the art. The means for transporting the food products may also be of any conventional type known to those skilled in the art.

Once a proper liquid bath and a suitable container or vessel has been chosen for a particular food product, a means for introducing the bubbles of ozone-air into the bath must be established. Any method that is capable of injecting or introducing a continuous flow of a plurality of such ozone containing bubbles into the liquid bath is adequate.

The ozone can be produced by any known method and mixed with air or any other gas that would not be harmful to the food product. An ozone-air mixture is preferred.

One way of introducing bubbles into the bath which is particularly contemplated for use in this invention is the introduction of a gaseous mixture of ozone and air directly into the liquid bath as a "bubble." This can be accomplished by creating an ozone and air mixture and conveying this ozone-air mixture through a manifold or other suitable means placed in relation to the liquid bath containing vessel so that this gaseous mixture is "bubbled" into the liquid bath by known techniques. The introduction of the gaseous ozone-air mixture must be such that a continuous stream or flow of a multitude of ozone-air bubbles is constantly introduced into the bath. It is desirable and most preferred that the bubbles be introduced at or near the bottom of the liquid bath container and allowed to stream upwardly, but other arrangements are also effective.

A second way of introducing the ozone-air bubbles into a liquid bath which is contemplated for use with the method of the present invention involves mixing a gaseous mixture of ozone and air together with the same type of liquid that is being used in the liquid bath and then injecting this aqueous combination into the liquid bath container in such a manner that a plurality or multitude of ozone-air bubbles are produced in the container. This method contemplates the use of jets or nozzles associated with the liquid bath container and in relationship therewith such that the ozone containing liquid can be forced into the container to form a continuous flow or stream of the ozone-air bubbles. It is contemplated that any of a number of commercially available static mixer devices may be advantageously utilized in connection with this method to facilitate mixture of the ozone-air gas and the liquid and in the formation of the bubbles. Again, upward movement of the bubbles is preferred, but not exclusive.

Referring to FIG. 1, a proposed apparatus for performing the method of this invention is depicted and is generally referred to by the numeral 10. A trough 12 is shown into which the food product is immersed. Manifold 14 is situated parallel to trough 12. Manifold 14 has a primary pipe 16 which is connected to a source that provides the liquid which makes up the liquid bath. Extending from and coupled with primary pipe 16 are a plurality of feeder tubes 18. Feeder tubes 18 are coupled with trough 12 in a manner providing a passageway for the liquid from primary tube 16 to enter trough 12 and preferably near the bottom of trough 12.

In order to introduce the ozone containing bubbles into trough 12, a second pipe 20 is provided that is coupled to each of feeder tubes 18 by a plurality of individual tubes 22 (FIG.2). Pipe 20 is connected at its opposite end to an ozone source that provides the ozone-air mixture that is to be introduced in bubble form into trough 12. Placed between the region where the ozone-containing gas enters feeder tubes 18 and the point where feeder tubes 18 open into trough 12 is a motionless mixer 24 that mixes the liquid from tube 16 with the ozone-containing gas from line 20 and tubes 22 to form the ozone-containing bubbles for entry into trough 12.

Motionless mixer 24 can be of any suitable type known and utilized by those skilled in the art for mixing fluid of this kind. FIG. 2 shows a cross-sectional view of such a mixer type utilizing inert plates 28 arranged so as to create the mixing and bubbling effect.

Shown in phantom in FIG. 1 is a conveyer 26 of any suitable kind which is capable of use with particular food products to move the food product through trough 12.

FIG. 2 depicts one of the proposed manners in which bubbles can be introduced into trough 12. The ozone containing gas is produced and caused to flow through pipe 20 and enters feeder tube 18 through tube 22. At this point the ozone-air mixture mixes with the liquid entering tube 18 through primary tube 16. This mixture is further mixed and bubbles 30 created by passage through motionless mixer 24. A continuous stream of a multitude of bubbles 30 are thus created and introduced near the bottom of trough 12 to contact with the food product, illustrated as a poultry carcass 32 supported on a rod 34, in FIG. 2.

Bubbles 30 stream upwardly through the liquid in trough 12 and contact the surfaces of carcass 32. Any excess liquid can escape trough 12 through outlet tube 36.

FIG. 3 depicts an alternate embodiment for introducing bubbles 30 into trough 12. Tube 38 is connected at one end to a source of ozone creating the ozone-air mixture. The ozone containing gas is introduced into trough 12 through three nozzles 40. The gas is pressurized such that as it is introduced into trough 12 through nozzles 40, bubbles 30 are created. This manner of introducing bubbles will also provide a continuous upward stream of a plurality of bubbles 30 for performing the method of this invention.

The mixing of ozone and air in either of the two systems described above or any other method used for mixing should produce a ratio of ozone to air within the range of twenty-five thousandths per cent (0.025%) to twenty per cent (20%) by weight. A practical range, considering the current capabilities of commercially available ozone generating equipment, is for the concentration of the ozone to be between 0.025% and 4% by weight.

The ratio by volume of the ozone-air mixture to the liquid in the liquid bath may be varied within certain practical but limited ranges depending upon the nature, configuration and size of the food products being sanitized. The ozone-air bubbles created should not be smaller than approximately 2 mm. in diameter, and bubbles larger than 10 mm. in diameter should be avoided. The objective is to produce a multitude of ozone-air bubbles having a continuous and ongoing flow through the liquid bath and of sufficient numbers to permit an intimate but fleeting wiping effect of the ozone on all surfaces of the food product being sanitized.

Once the liquid bath has been established and the means for introducing the ozone-air bubbles into the liquid has been selected, the method of the present invention can be carried out for the effective sanitizing of food products.

The food products that are desired to be sanitized are then immersed into the bubble-filled bath and caused to be transported through the container in a manner which brings the ozone-air bubbles present in the bath directly in contact with and flowing over the surfaces of the food product. The number of ozone-air bubbles introduced in the container should always be an amount such that a constant stream of bubbles is noticeable. The length of time that the food product is kept in the bath in contact with the bubble stream is dependent upon the particular food product involved. However, in all cases the time should be sufficient so that all of the surfaces of the food product are contacted by a plurality of ozone-air bubbles during the treatment. The surfaces of the food product so immersed are thereby exposed to a repetitious flow of ozone-air bubbles while in the liquid bath.

While the exact mode of action creating the sanitizing effect of the ozone-air bubbles is not fully understood, it is known that ozone is an oxidizing agent. It is believed that as the bubbles flow over the surfaces of the food products, the bubbles burst in such a manner that the ozone therein interfaces with the surfaces of the products and create a "flash oxidation" effect. This ozone "wiping" of the surfaces of the food products effectively and efficiently eliminates bacteria or other harmful agents on those surfaces.

Since the ozone-air bubbles are in intimate contact with the food product for a relatively short time, no physical or cosmetic damage to the product occurs. Additionally, the ozone becomes assimilated into the liquid bath so as to provide a continuing sanitizing effect on the liquid bath itself to prevent cross-contamination.

While the method of this invention has applicability to a wide range of food products, it has particular applicability in the poultry industry. The existence of surface borne bacteria on poultry carcasses is well known and an adequate solution to the problem has not heretofore existed. The method of this invention is useful in eliminating harmful bacteria from the surfaces of poultry carcasses that are being processed for human consumption.

By way of example and comparison, the following examples were run:

EXAMPLE 1

Poultry carcasses were immersed in water seeded with the bacteria *Salmonella typhimurium*. Some of the carcasses exposed to the Salmonella were then immersed in an ozone saturated water bath where the concentration of ozone in the water was about 35–40 part per million (ppm). No bubbles of ozone were present in the ozonated water. After 5 minutes of exposure to the ozonated water the carcasses were removed and tested for the presence of Salmonella. Other carcasses exposed to the Salmonella were not immersed in an ozonated water bath, but were immersed into a liquid bath without ozone for an equal period of 5 minutes as a control group.

The average standard plate count for Salmonella on the control carcasses was determined to be 194,000 CFU/ml. The average standard plate count for Salmonella for the ozonated water exposed carcasses was determined to be 225,800 CFU/ml.

The samples were taken by an immersion technique whereby the carcass to be tested is placed in sterile water and the bacteria collected in the sterile water for examination. The technique utilized is described as The Final Protocol Submitted to Participating Laboratories during the 1987 National Broiler Council Study to Determine Industry-Wide levels of Salmonella Contamination in Poultry.

There appears to be no significant reduction in the number of Salmonella present on a carcass by merely immersing it in ozonated water.

EXAMPLE 2

Poultry carcasses similarly exposed to water seeded with *Salmonella typhimurium* were then immersed into a trough of water into which an ozone-air mixture was introduced through use of a motionless or static mixer. The water in the trough had noticeable bubbles of ozone-air streaming upwardly through the trough. The concentration of ozone in the water was again about 35-40 ppm. After various residence times the carcasses were removed and analyzed for the presence of Salmonella as described in Example 1.

After 10 minutes residence in the water bath with ozone-air bubbles, the average Salmonella count was determined to be 6,100 CFU/ml at 42 F and 665 CFU/ml at 32 F.

From the foregoing, it will be seen that this invention is one well adapted to attain all the ends and objects hereinabove set forth together with other advantages which are obvious and which are inherent to the method.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A method for sanitizing food products capable of being immersed in a liquid bath comprising the steps of:
   introducing an ozone containing gas into said liquid bath in a manner creating a continuous flow of a plurality of ozone containing bubbles in said liquid bath;
   placing said food products into said liquid bath in a manner allowing said ozone containing bubbles to contact and wipe over the surface of said food products; and
   removing said food products from said liquid bath.

2. The method as set forth in claim 1 wherein said ozone containing gas is a mixture of ozone and air.

3. The method as set forth in claim 2 wherein the concentration of ozone in said mixture is between 0.025% and 20% by weight.

4. The method as set forth in claim 3 wherein the concentration of ozone in said mixture is between 0.025% and 4% by weight.

5. The method as set forth in claim 1 wherein said ozone containing bubbles are created in said liquid bath by forcing said ozone containing gas directly into said liquid bath.

6. The method as set forth in claim 1 wherein said ozone containing gas is mixed with a quantity of the liquid of said liquid bath prior to said introduction into said liquid bath.

7. The method as set forth in claim 1 wherein the size of ozone containing bubble is between 2 mm and 10 mm in diameter.

8. The method as set forth in claim 1 wherein the quantity of said ozone containing bubbles in said liquid bath is sufficient to permit all surfaces of the food products being sanitized to interface with said bubbles.

* * * * *